(12) United States Patent
Refer

(10) Patent No.: US 6,843,168 B2
(45) Date of Patent: Jan. 18, 2005

(54) APPARATUS FOR PRESSING EDIBLE ARTICLES

(75) Inventor: Jacob Christian Refer, Helsingør (DK)

(73) Assignee: Aasted-Mikroverk ApS, Farum (DK)

( * ) Notice: Subject to any disclaimer, the term of this patent is extended or adjusted under 35 U.S.C. 154(b) by 0 days.

(21) Appl. No.: 10/653,359

(22) Filed: Aug. 28, 2003

(65) Prior Publication Data

US 2004/0144261 A1 Jul. 29, 2004

(30) Foreign Application Priority Data

Sep. 6, 2002 (EP) .............................................. 02078649

(51) Int. Cl.⁷ .............................. A23L 1/00; A23G 1/00; A23G 1/10; A23G 1/20; A23G 1/21
(52) U.S. Cl. ............................. 99/353; 99/355; 99/452; 99/455; 99/483; 99/517; 425/410; 425/414; 425/416
(58) Field of Search .................. 99/340, 349, 352–355, 99/348, 372, 516, 517, 452–455, 483, 485; 425/547, 398, 422, 410, 443, 414, 216, 416, 292, 408; 426/512, 524, 514, 515, 660, 519, 138, 231, 631, 478, 486, 487; 366/144–149, 293, 304

(56) References Cited

U.S. PATENT DOCUMENTS

| | | | | |
|---|---|---|---|---|
| 1,647,944 A | * | 11/1927 | Villasenor | 425/216 |
| 4,706,558 A | * | 11/1987 | Snyder, Jr. | 99/455 |
| 5,409,722 A | * | 4/1995 | Binley | 426/515 |
| 5,705,217 A | * | 1/1998 | Aasted | 426/512 |
| 5,911,811 A | * | 6/1999 | Muntener | 99/348 |
| 6,065,395 A | * | 5/2000 | Sollich | 99/470 |
| 6,268,006 B1 | * | 7/2001 | Knobel | 426/515 |
| 6,327,969 B1 | * | 12/2001 | Knobel | 99/476 |
| 6,497,568 B1 | * | 12/2002 | Aasted | 425/547 |
| 6,641,386 B2 | * | 11/2003 | Aasted | 425/547 |
| 6,644,955 B2 | * | 11/2003 | Aasted | 425/547 |

FOREIGN PATENT DOCUMENTS

| | | |
|---|---|---|
| DE | 198 52 262 A 1 | 5/2000 |
| EP | 0 923 876 A1 | 6/1999 |
| FR | 620589 | 4/1927 |
| GB | 462596 | 3/1937 |
| GB | 996995 | 6/1965 |
| WO | WO 98/52425 | 11/1998 |

* cited by examiner

Primary Examiner—Timothy F. Simone
(74) Attorney, Agent, or Firm—Finnegan, Henderson, Farabow, Garrett & Dunner, L.L.P.

(57) ABSTRACT

An embodiment of the invention includes an apparatus for pressing an edible article. The apparatus includes a holding device including a channel for circulating a cooling liquid and also including an independently suspended plunger. The independently suspended plunger includes a lower part with a pressing surface configured to be pressed into contact with an edible mass. The independently suspended plunger also includes an upper part with a sliding surface supported by an opposing sliding surface that defines an opening of the holding device. The upper part has a circular cross-section and the lower part has a non-circular cross-section. The upper part and the lower part are separate parts that are joined together.

17 Claims, 10 Drawing Sheets

APPARATUS FOR PRESSING EDIBLE ARTICLES

CROSS-REFERENCE TO RELATED APPLICATIONS

This application claims the benefit under 35 U.S.C. §119 (a)–(d) of European Patent Application No. 02078649.7 filed in the European Patent Office on Sep. 6, 2002, the entirety of which is incorporated herein by reference.

DESCRIPTION OF THE INVENTION

1. Field of the Invention

The present invention concerns apparatuses for pressing of edible articles comprising a holding device with at least one cooling channel and carrying a number of suspended, cooled plungers which is pressed into the mass. Many types of mass may apply as long as the mass is capable of reaching a deformable state before being pressed into shape. Chocolate mass, whether it is in a highly liquid state, a thick paste-like, viscous state or in a powder form may for example apply. The chocolate mass may have a content of genuine cocoa butter or simply be a so-called chocolate-like mass by which the butter is substituted with other kinds of fats or oils such as palm-kernel oils. Decisive is, that the particular mass in question is deformable by the pressing action of cold plungers.

The mass may be deposited in underlying mould cavities or directly upon a conveyor belt before the pressing operation. The intention could also be to press or stamp a covering chocolate layer deposited upon a previously made edible article, such as a chocolate article or a biscuit. The covering layer to be pressed could for example be a bottom covering layer deposited upon a centre mass deposited into the inner cavity of a pre-made chocolate shell or a covering layer deposited upon a bar-shaped centre.

An inner chocolate layer on pre-made articles could also be made, for example by depositing tempered chocolate-like mass in an already made shell, optionally shaking the moulds, and then immersing cold plungers into the deposited mass for making shells with predetermined and even thickness. The first pre-made shell could be of one chocolate type such as ordinary milk chocolate and the inner chocolate layer made subsequently could be of another chocolate type, such as a white chocolate type.

When for example shells are to be made, an apparatus comprises a plate-like holding device carrying a number of cooled plungers to be immersed into underlying mould cavities in a mould plate. In each mould cavity is deposited liquid chocolate, and by lowering the holding device, the plungers are simultaneously immersed into the chocolate in the different mould cavities. By the pressing action of the plungers, the chocolate mass is pressed into shells having the desired shape. Due to the cooling of the plungers a forced solidification of the influenced chocolate mass is achieved in contact therewith. The chocolate mass then contracts slightly and releases the pressing surfaces of the plungers which may be lifted up and free therefrom within seconds.

2. Background of the Invention

Generally, chocolate masses are suspensions of non-fat particles such as sugar, milk powders and cocoa solids mixed up with a liquid fat constituent. Often, the fat phase comprises genuine cocoa butter of until around 30%, but may comprise substitutes as well. Such substitutes can be in the form of other types of fat-containing oils. Chocolate types where the cocoa butter has been replaced wholly or partly by other fats are often named commercially as compound chocolate, in which the cocoa butter has been replaced by palm-kernel oil. Mass made of 100% fat in the form of cocoa butter or the like as compound is also possible.

However, for the chocolate-like masses it is decisive, that whether the fat phase constitutes of genuine cocoa butter or substitutes thereof, the fat phase is capable of crystallizing into stable crystal types, such as the β-crystals developing in genuine cocoa butter when the mass solidifies.

Before being supplied in liquid state to the apparatus, the chocolate is typically being treated for providing stable beta-V crystals at solidification. The treatment could be a tempering process by which the mass is generally brought to around 40–50° C., where after it is being cooled to around 25–34° C., so that crystallisation is initiated. Then the mass is reheated around 0.5–2.0° C. for re-melting most of the in-stable crystals in the mass, however preserving a content of stable βV-crystals, which melts at a higher temperature than the in-stable crystals. The stable crystals are preserved in the mass ready for depositing in an amount of typically 0.01%–5%, preferably in an amount of 0.1%–2%. Before being supplied the chocolate could also be treated by other processes such as cooling the chocolate to around 30–34° C., then seeding it with already made powder having a content of desirable beta V crystals for ensuring the solidification into proper crystals.

After the shells made have solidified, they may be filled with a centre mass of a creamy or liquid food material, which differs from that of the shell material. The centre mass could be an alcohol containing mass, a sugar containing mass or a creamy fondant mass, simply any of the centre masses known to the chocolate industry. Finally, a chocolate covering layer may be deposited for closing the centre mass off, thereby creating a complete article. The articles could have any shape, size and configuration and could typically be "pralines", tablets, or slabs such as for example the well-known quadrangular slabs or tablets with all kind of centre masses, crunchy or creamy.

Advantageously, the chocolate covering layers can be pressed with an apparatus according to the invention, however, also chocolate covering layers deposited upon other types of edible articles may advantageously be pressed with the inventive apparatus. Edible articles such as bars, biscuits or bakery articles are generally excellent to provide with a chocolate covering layer being pressed by the inventive apparatus.

If a bottom covering layer is not created on a pre-made shell, the articles made by the apparatus could typically be figures or eggs or egg-like articles, which are created by joining together two chocolate shells with each other. Both shell halves may be made with the inventive apparatus, and a centre mass may be deposited before the halves are being joined. Instead of a centre mass the cavity between the joined shells could simply contain some kind of surprise, such as a small plastic container comprising kids toys inside the well-known "Surprise" eggs.

WO 98/52425 (KMB, Knobel) discloses an apparatus having numerous plungers permanently fixed to a carrier or holding plate. The carrier plate as well as the plungers comprise major inner channels through which cooling liquid is forced to flow for achieving the necessary cooling of the plungers. Such construction may be used when relatively large articles such as Easter eggs or surprise eggs are to be made. However, the inner channels of the plungers makes it expensive to manufacture. When smaller articles are to be produced, the smaller plungers with inner channels becomes difficult, very expensive and if not impossible to make. Furthermore, the inner channels of such small or slim plungers becomes insufficient for providing the necessary cooling to the plungers and then to the chocolate being pressed. The plungers are fixed to the plate-like holding device and is impossible to replace with other plungers having different configuration, shape or size.

WO 98/52425 (KMB, Knobel) furthermore discloses, that the plungers are arranged with substantial mutual distance at the holding device without consideration to an optimal utilization of the fixed surface area of the mould plates. The result is a production capacity being considerably lower than desired. For the manufacturer of the chocolate articles it is of outmost importance for his economy to press as many articles as possible each time the holding device makes a pressing operation.

EP 0923876 A discloses an apparatus of the introductory type and by which the independently suspended plungers are made in one solid piece with the same cross-sectional shape in all of their length. The upper part of each plunger comprises sliding surfaces and is arranged vertically movable in a hole in the holding device. Sliding surfaces of the upper part is then supported by opposite sliding surfaces of the hole in the holding device.

The sliding surfaces transmits cooling from the holding device and to the pressing surfaces for cooling the warmer chocolate when being pressed. Each plunger may be further supported by an upper slim slide guidance.

However, plungers with such length as disclosed in the EP-publication and in practice being between 50–100 mm necessary for obtaining proper support by the opposite sliding surfaces of the holding device, is very expensive to manufacture. Complex shapes of the articles available on today's market requires that the plungers are made with complex cross-sectional shapes as well.

The lower part of the plungers having the pressing surfaces is created with the exact shape for making the inside or contour of the pressed chocolate articles. As disclosed in the EP-publication the same exact cross-sectional shape is preserved all the way up through the upper plunger part and to the top thereof incorporating the sliding surfaces of the plunger.

The disclosed configuration requires the best and most accurate technologies within the art of tool-making with the consequence, that the manufacturing expenses of the plungers becomes excessively high. The expenses of making the corresponding openings with the opposite sliding surfaces in the holding device are high as well. The sliding surfaces of the openings as well as the sliding surfaces of the plungers are made with very fine tolerances for obtaining proper and un-problematic function during long-time pressing of articles.

In total, the manufacturing expenses of making the plungers and the corresponding openings of the holding device becomes a major part of the apparatus, which typically carries between 50 and 200 plungers depending on the size of the articles to be pressed.

As the expenses of making the plungers and the corresponding holes with the opposite supporting gliding surfaces in the holding device constitutes a substantial part of the total expenses of manufacturing the apparatus, it becomes important to reduce the expenses of making the plungers and the supporting holes in the holding device.

The holding device and the plungers are furthermore only adapted to make articles with one specific shape and configuration as determined by the configuration of the pressing surfaces and cross-sectional shape of the plungers being preserved all the way to the top working in the holding device. Articles with other configurations and shapes are impossible to make with the same apparatus. Every time a differently configured article is to be produced with the same apparatus another holding device with differently shaped openings with slide surfaces and a correspondingly shaped new set of plungers must be produced.

For the manufacturer of the chocolate articles it is crucial to his business to achieve as high capacity as possible of the apparatus, so that as many articles as possible are pressed within a given time period. Consequently, the apparatus must produce as many articles as possible per pressing operation, i.e. each time the holding device is lowered against the underlying mould or conveyor belt.

When the articles are pressed in mould cavities, the available area for pressing the articles is determined by the size of a standard mould, which typically has a width of 275 mm and a length of 625 mm. Within this area as many mould cavities and corresponding plungers must be arranged for reaching as high pressing capacity of the apparatus as possible. A decisive factor for reaching as high production capacity of the apparatus as possible is then the compactness of the arrangement of the plungers at the holding device.

A problem to solve is to provide an apparatus of the introductory art, which can be used for making differently shaped products without changing the holding device for the multiple plungers.

Another problem to solve is to provide an apparatus by which the holding device is considerably simpler and less cost expensive to produce than the prior known ones.

SUMMARY OF THE INVENTION

The apparatus according to the present invention is characterized in, that the upper part has a circular cross-section and the lower part has a non-circular cross-section, and that the parts are separate parts, which are joined together.

Hereby is obtained, that the holding device and the movable, upper plunger parts arranged in the openings with the sliding surfaces are made in the simplest possible manner as a separate unit independent of the required shape and geometry of the articles to be made. The lower plunger parts comprising the complex geometry of the pressing surfaces are also made as separate units, which are then joined to the upper plunger parts in the holding device when the articles having the particular shape are to be produced.

The upper plunger parts as well as the supporting openings in the holding device all have circular cross-sections and are thereby made by basic, simple drilling and milling operations. Consequently it have become simple, fast, and cheap to make the upper plunger parts and especially the supporting holes. The expenses are typically reduced between 50 and 90%. Only the lower plunger parts are made with the required non-circular geometry of the articles to be pressed.

For plungers having complex geometries, i.e. cross-sections other than circular or having relatively slim or small cross-sections it can then be avoided, that the pressing surfaces of the plungers functions as sliding surfaces supported by opposite sliding surfaces of the holding device. Every part of the surfaces of the plungers can be moving outside contact with the holding device, yet is obtained an efficient heat transport and cooling of the plungers through the upper circular plunger parts.

All of the multiple lower plunger parts may have identical non-circular shapes as when all the articles to be in each moulding operation are identical in shape and configuration.

Especially when more than one pressing operation is to be performed on the same articles, such as when a first operation incorporates pressing of the shells and the second operation incorporates pressing of a bottom layer thereupon the solution is advantageous.

An unforeseen flexibility is also obtained as identical holding devices may be provided with differently shaped lower plunger parts. An apparatus may for example comprise a first holding device having lower plunger parts with one configuration for making shells. However, the apparatus may also comprise a second holding device being identical to the first one apart from the fixed lower plunger parts now having the shape for pressing a chocolate covering layer as a bottom upon the pre-made chocolate shells.

Another advantage is, that the individual lower plunger parts fixed to the same holding device may have different configuration, so that differently shaped chocolate articles may be pressed with the same holding device. The mutual arrangement or pattern of the differently shaped articles pressed in the same pressing stroke may be transferred directly into a sales box. Cumbersome handling and sorting of differently shaped articles are thereby avoided.

However, when differently shaped articles are to be produced this can be done in the one and same production line. Differently shaped lower plunger parts are simply joined with the upper plunger parts of the same holding device. The underlying moulds then comprises differently shaped cavities arranged under the appropriate lower plunger parts. Several differently shaped articles are then made in the same moulding operation and the need for further moulding lines is avoided. The differently shaped lower plunger parts may be arranged in a mutual pattern, which is desirable to be transferred directly into a box, such as a gift box when the articles are to be packed.

The utility of the holding device as a separate unit with the upper plunger parts makes it possible to provide it in different standard configurations onto which differently shaped lower plunger parts may be fixed for pressing differently sized articles. One holding device may comprise 40 upper plunger parts having a diameter of 50 mm being evenly distributed over the prefixed holding plate of the device. The lower plunger parts fixed to that holding device could for example have a configuration for making shells for slabs. Another holding device having the same size of the holding plate may comprise 60 evenly distributed upper plunger parts having a diameter of 35 mm. The lower plunger parts to be fixed to that holding device could for example have the configuration adapted to press a chocolate covering layer of a biscuit. Yet another holding device having the same size of the holding plate may comprise 80 evenly distributed upper plunger parts having a diameter of 25 mm. The configuration of the lower plunger parts suitable for this configuration of the holding device may for example be suitable for pressing shells for "Pralines" or bottom coverings thereof.

The apparatus may comprise a closure plate having openings through which the lower plunger parts extends, and which is movably suspended below the holding device. When lowering the holding device during a moulding and pressing action the closure plate comes to rest upon the upper surface of the mould plate. Thereby a completely tight closure of the mould cavities are achieved before the holding plate and consequently the lower plunger parts are lowered further and under pressure causes the chocolate mass to completely fill out the moulding cavities. Subsequently cutting of the upper rims of the articles are then unnecessary and dirtying of the moulds and production facilities with cut-off particles of chocolate is then avoided.

BRIEF DESCRIPTION OF THE DRAWINGS

The invention is explained further below by reference to preferred embodiments as well as the drawing, in which.

DESCRIPTION OF THE EMBODIMENTS

Figure 1:
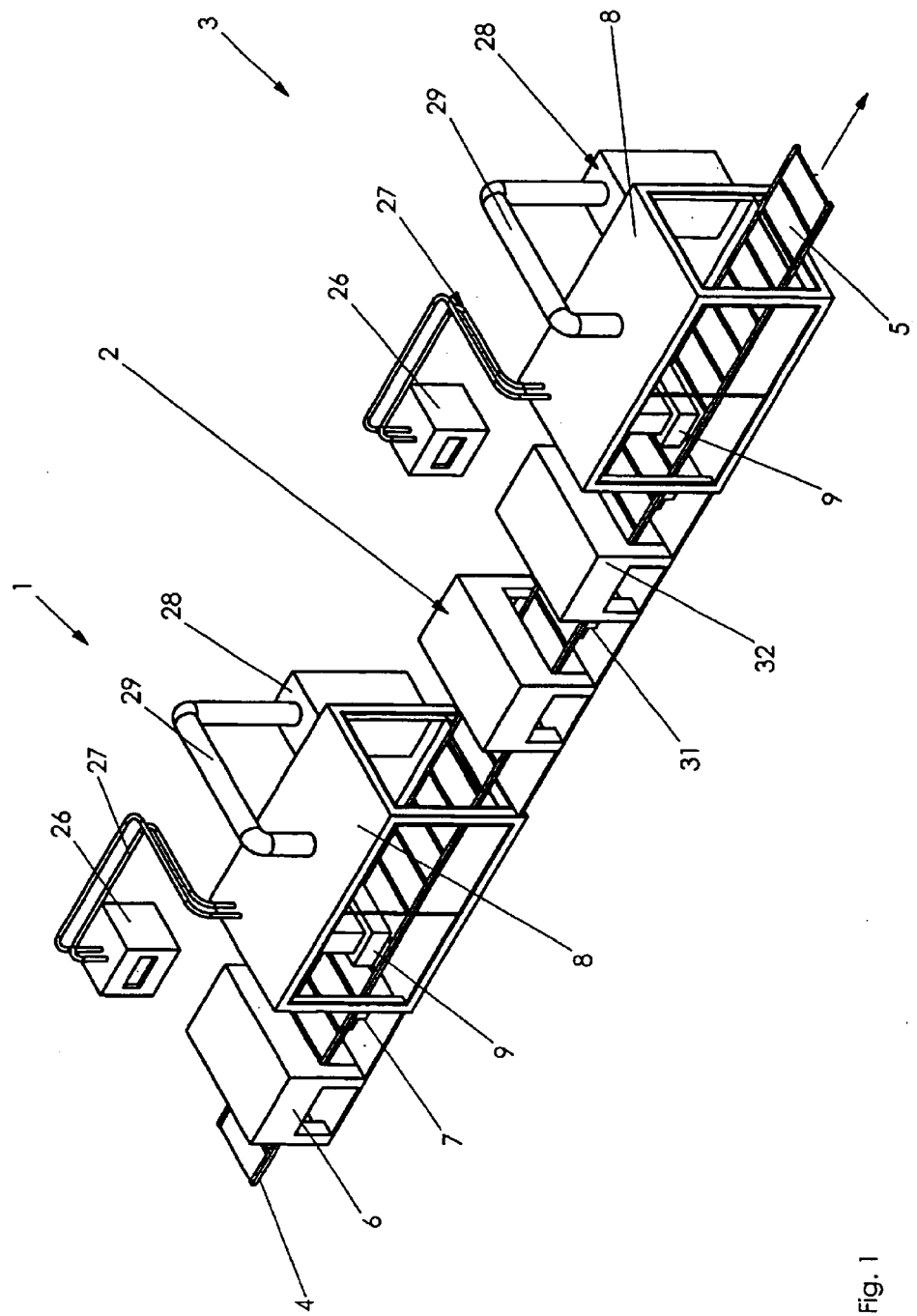
FIG. 1 is a schematical, perspective view of part of a production plant according to the invention.

The apparatus disclosed in FIG. 1 constitutes part of a major plant for manufacturing of chocolate articles. The apparatus comprises a shell moulding section 1, a centre filling station 2 and a bottom covering pressing section 3. The choice of sections are optional within the inventive idea as only one section is necessary for performing a pressing operation such as a shell pressing or a bottom pressing. Neither is the inventive idea limited to any particular configuration of the articles such as shells as long as the mass simply is capable of being pressed out. Other examples of articles are tables or bars and pressing of chocolate covering layers upon pre-made articles such as upon filled shells or upon pre-made biscuits.

A continuously moving conveyor 4 extends through the stations 1, 2 and 3 and carries a great number of juxtaposed mould plates 5. For sake of simplicity is only disclosed the part of the conveyor 4 running through the depicted stations 1, 2 and 3. Subsequently to the bottom covering pressing station 3 is normally arranged a cooling tunnel and a wrapping section. Both the disclosed shell moulding section 1 and the bottom covering pressing section 3 comprise the inventive idea.

Figure 3:
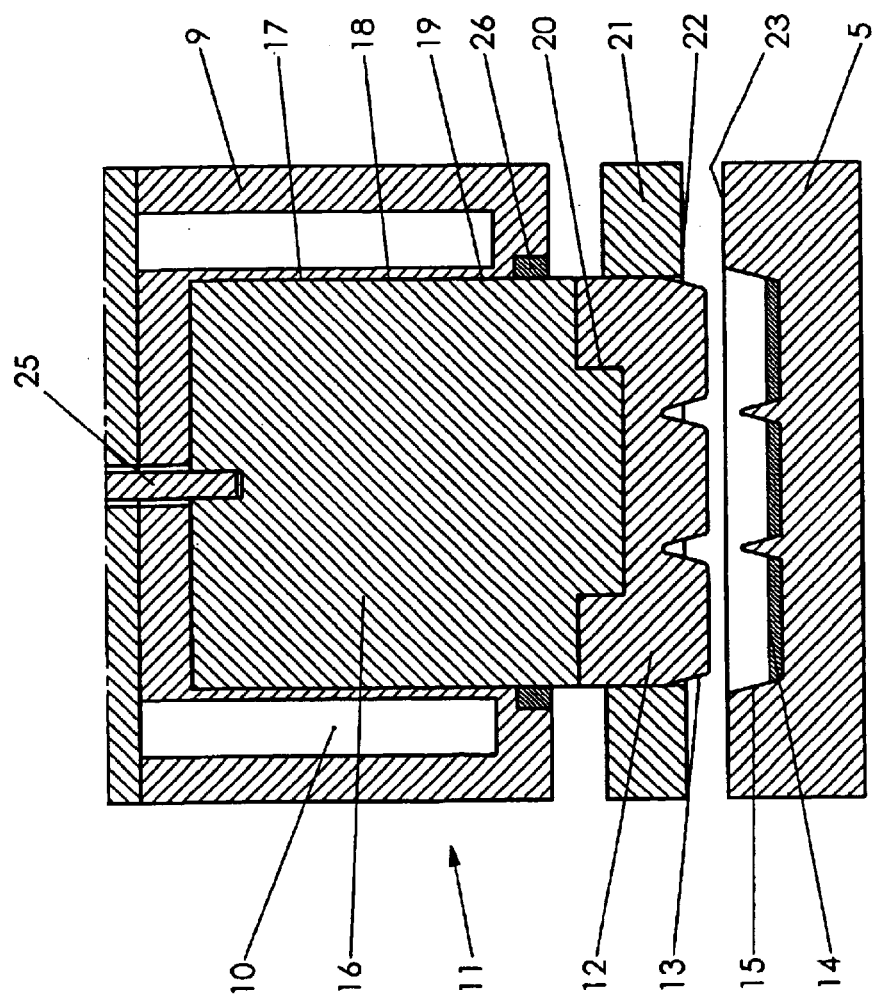
FIG. 3 is a schematical section of a part of the holding device, for clarity disclosing only one plunger and one underlying mould cavity with deposited chocolate

The schematically disclosed housing 6 comprises some kind of depositor means, which deposit the edible mass and as in the disclosed example ready tempered chocolate mass into the individual mould cavities 15 of each mould plate 5. Each mould plate 5 comprises typically between 50 and 200 mould cavities of which only one is disclosed for sake of clarity, i.e. FIG. 3. Each individual mould plate 5 is then carried on by the conveyor 4 and passes over a shaking table 7, which distributes the deposited chocolate evenly within the individual mould cavities.

Then the mould plates 5 enters the shell moulding or pressing housing 8, within which the deposited chocolate is pressed by the action of the plungers into shape of the desired articles. In the moulding housing 8 is arranged a schematically disclosed holding device 9. The holding device 9 is arranged with known means such as columns and slides, a motor for creating the movement and related control panels and software for controlling the up- and down movement of the holding device 9 each time it is in engagement with a mould plate and shells are pressed in the mould cavities.

As disclosed in FIGS. 3–6 the holding device 9 comprises at least one channel 10 for circulation of a cooling liquid and carries a plurality of independently suspended plungers 11. Each plunger 11 has a lower part 12 with pressing surfaces 13 to be pressed into contact with the mass 14 in the mould cavity 15. Each plunger 11 also comprises an upper part 16 with sliding surfaces 17 supported by opposite sliding surfaces 18 of openings 19 in the holding device 9.

Figure 2:
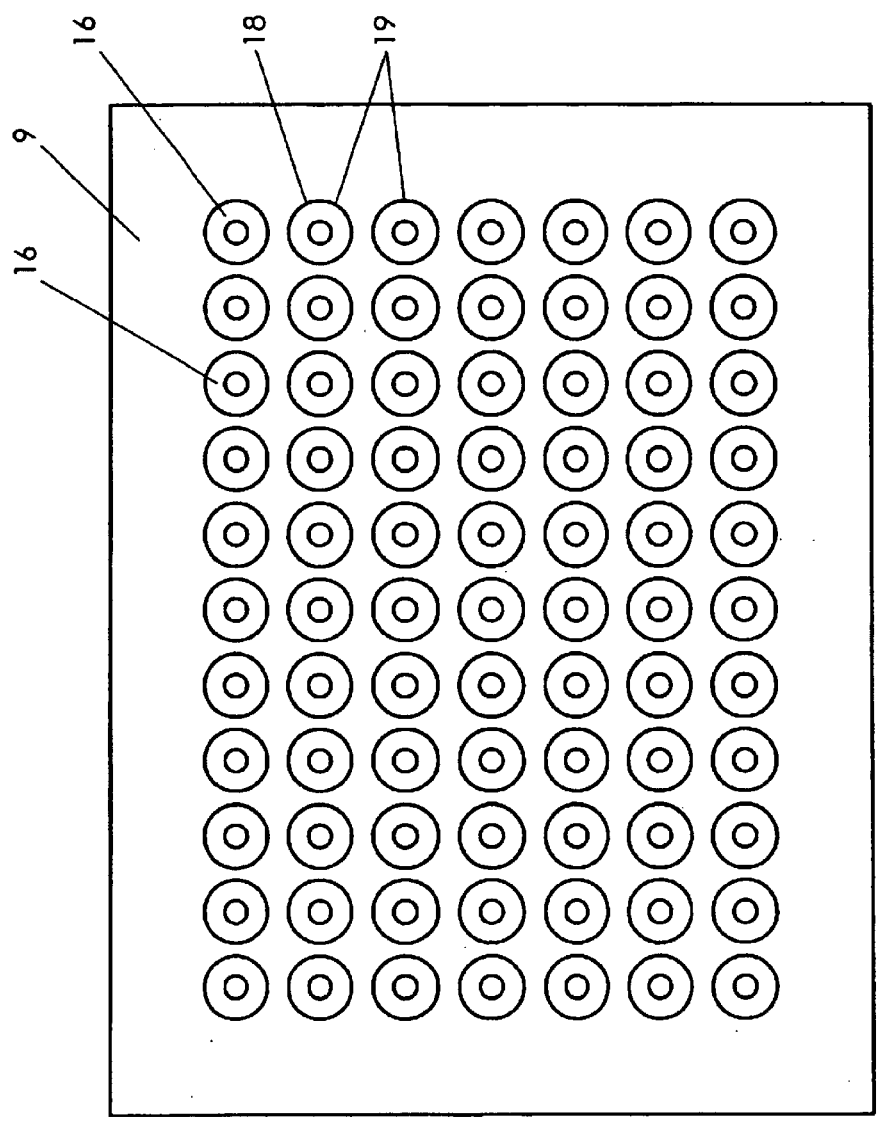
FIG. 2 is a schematical view of a first holding device, seen from below without any lower plunger parts.

The upper plunger part 16 has a circular cross-section and fits into the openings 19, which also features a circular cross-section. In FIG. 2 the holding device 9 is disclosed from below without the lower plunger parts 12 so that the circular cross-sections of the upper plunger parts 16 can easily be seen.

As disclosed in FIGS. 3–6 the lower plunger parts 12 are joined with the upper plunger parts 16, for example by simple screw joints 20, so that the lower parts 12 fast and easily may be changed with parts having different configurations.

The upper plunger parts 16 and the supporting openings 19 of the holding device 9 are simple and cheap to make by basic drilling and milling operations. Only the lower plunger parts 12 are made with the required non-circular geometry of the articles to be pressed. The expenses of making the holding devices are typically reduced with 50–90% in comparison with the prior art. Each holding device may furthermore be fitted with lower plunger parts 12 having essentially any configuration and shape so that a holding device with plungers fitted are not limited to the pressing of only one specific article with particular shape and configuration as by the prior art.

The apparatus may advantageously be fitted with a closure plate 21 having openings 22 through which the lower plunger parts 12 extends, and which is movably suspended below the holding device 9.

Before a pressing operation the holding device 9 is brought in line with the next underlying mould plate 5 so that each plunger 11 is exactly above an underlying mould cavity 15 in the particular mould plate 5. During the pressing operation the conveyor 4 is stopped or the holding device is forces to run synchronously with the same speed as that of the conveyor 4. In the secondly mentioned option the holding device is retracted to its initial starting position after completion of a pressing operation and so that a new may be initiated.

Figure 4:
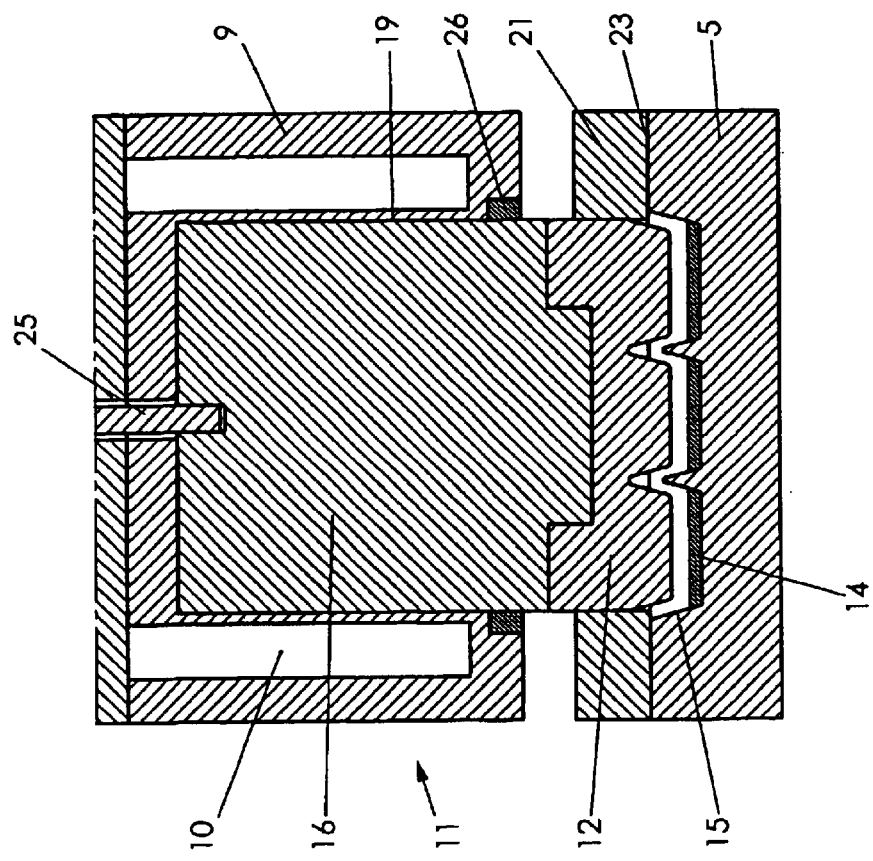
FIG. 4 is the same disclosed in a lower position by which the closure plate of the holding device has come to rest upon the mould plate.
Figure 5:
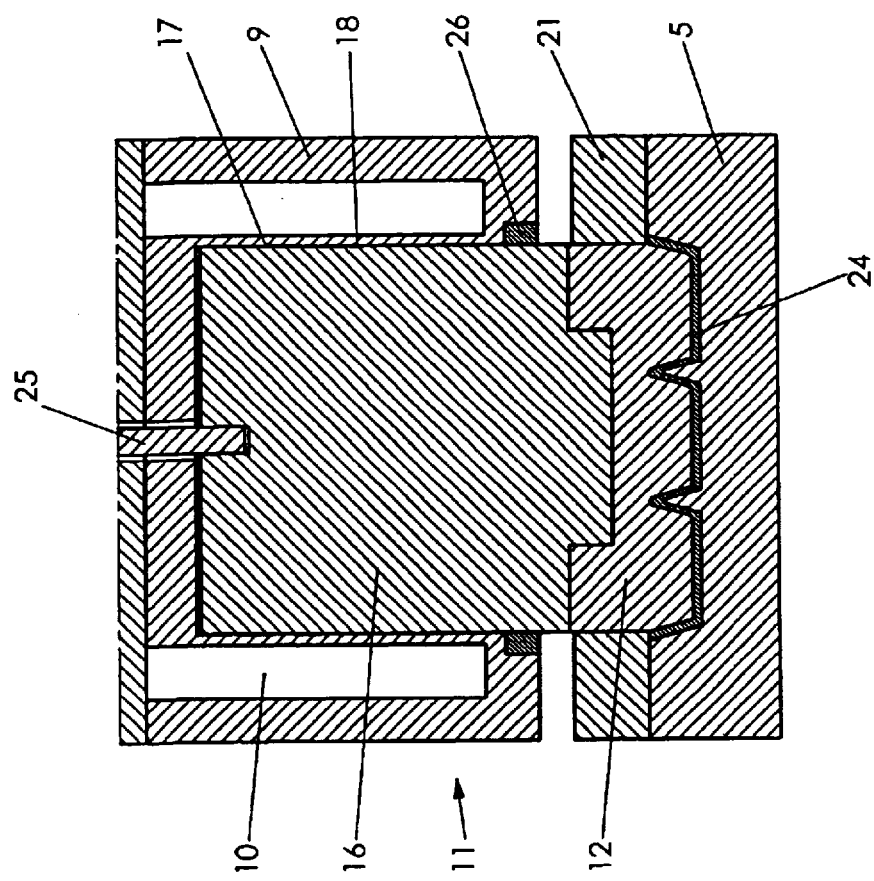
FIG. 5 is the same disclosed in the lowermost position of the holding device and the plungers at which the chocolate is pressed to complete filling out of the enclosed cavity.

Before the actual pressing operation the holding device 9 is lowered to such extend, that the closure plate 21 has come to engagement with the upper surface 23 of the underlying mould plate 5 so that safe enclosure of the pressing cavity is obtained as depicted in FIG. 4.

The closure plate 21 is typically suspended by a non-disclosed spring means to the holding device, so that by the further lowering of the holding device the closure plate is kept pressed on to the upper surface 23 of the mould plate 5. The multiple plungers 11 of the holding device then moves further on into engagement with the chocolate mass 14 by the continuing lowering of the holding device 9. The mass is pressed out into complete filling out of the enclosed cavity as disclosed in FIG. 5 so that the full geometry of the desired articles 24 are obtained. The upper plunger parts 16 may be acting against a spring-load created by spring-means or pressurized air between the plunger part 16 and the holding device 9, for example transferred via a slim guide pin 25. Gaskets 26 may be arranged for supporting the periphery of the plunger part 16 and closing off the gap between the sliding surfaces 17, 18.

After the pressing of the articles 24 is completed, the holding device is retracted to its upper position being ready for a new pressing to follow.

During the pressing circulation of cooling liquid through the channels 10 of the holding device is controlled by the schematically depicted unit 26 connected with the channels via hoses 27. The unit comprises a cooling device for keeping a constant temperature of the circulating liquid or for keeping a constant temperature at a surface, such as typically the pressing surfaces 13 of the lower plunger parts 12. The temperature may advantageously be as low as between +5 and −25 degrees Celsius, however decisive is, that the temperature of the pressing surfaces is kept below the solidification temperature of the particular mass being pressed. The pressing surfaces are typically of high gloss and are free of any lubricant.

An air drying device 28 is connected to the housing 8 via a hose 29 and is adapted to blow or circulate dry air through the housing 8. The humidity may be lowered to such extent, that no condensation is created on the pressing surfaces whatever the temperature of the pressing surfaces may be. However, for the pressing of some masses it may also be desirable, that the dewpoint-temperature of the air is slightly above the surface temperature of the pressing surfaces. Decisive is that the humidity is regulated in accordance with the actually required need for the articles to be pressed.

By the particular embodiment, the mould plates 5 with the ready pressed shells or tablets 24 are moved on through the centre filling section 2, at which an optional centre mass such as cream or a crunchy mass 30 is deposited into the inner cavity of each tablet 24. Advantageously, the mould plates 5 passes over a shaking table 31 for obtaining secure spreading of the centre mass 30 in the tablet or shell 24.

Thereafter, the mould plates passes into a station for depositing a chocolate covering 43 on to the articles 24 for closing of the centre mass 30. The mould plate 5 moves on into the final bottom covering pressing station 3. The station 3 is in principle identical to the station 1 apart from that the lower plunger parts 12 have been replaced by lower plunger parts 33 with flat pressing surfaces 34 for pressing of the covering 43.

Figure 6:
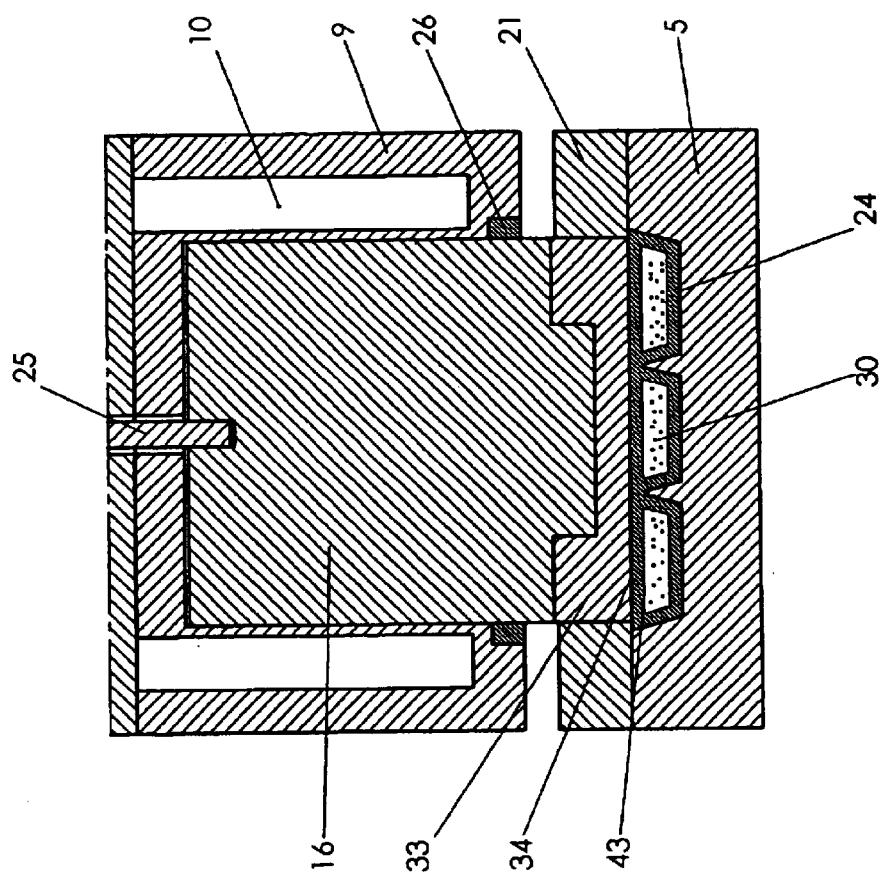
FIG. 6 is a schematical section of a part of a further holding device, which is adapted to press on top of a covering layer deposited on top of the previously made chocolate article by the first holding device.
Figure 7:
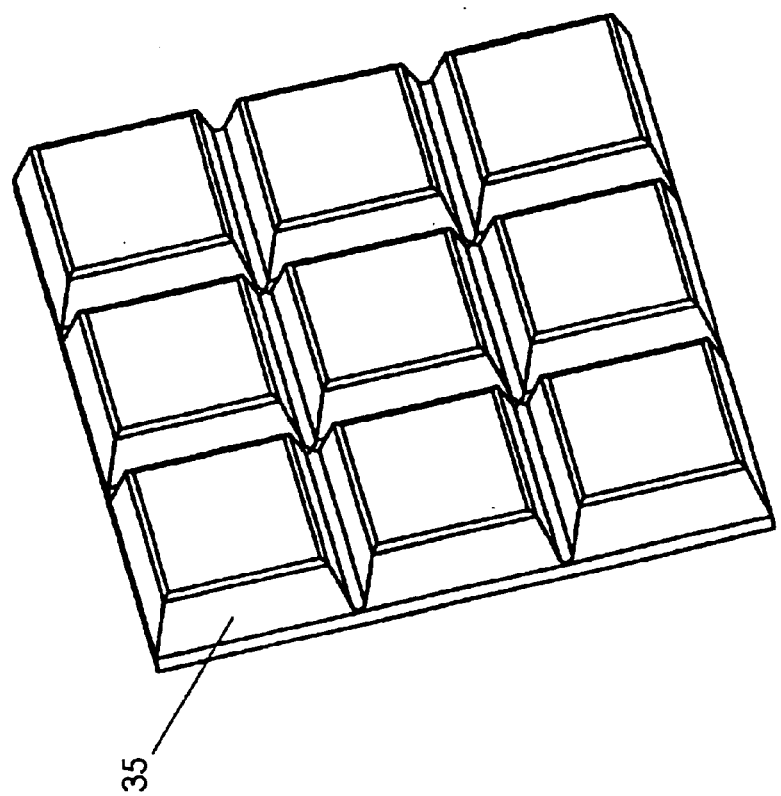
FIG. 7 is a schematical, perspective view of the completed chocolate article made by the apparatus and plunger shapes disclosed in FIGS. 2–6.

Then the station 3 comprises a holding device 9 functioning in exactly the same manner as that of station 1 as depicted in FIG. 6 where the pressing of the covering layer 43 is disclosed. As depicted in FIG. 1 a unit 26 may also be arranged for controlling the temperature of the cooling liquid and a drying unit 28 may be arranged for controlling the humidity of the housing 8 of the station 3. The ready made chocolate article 35 is disclosed in FIG. 7.

Figure 8:
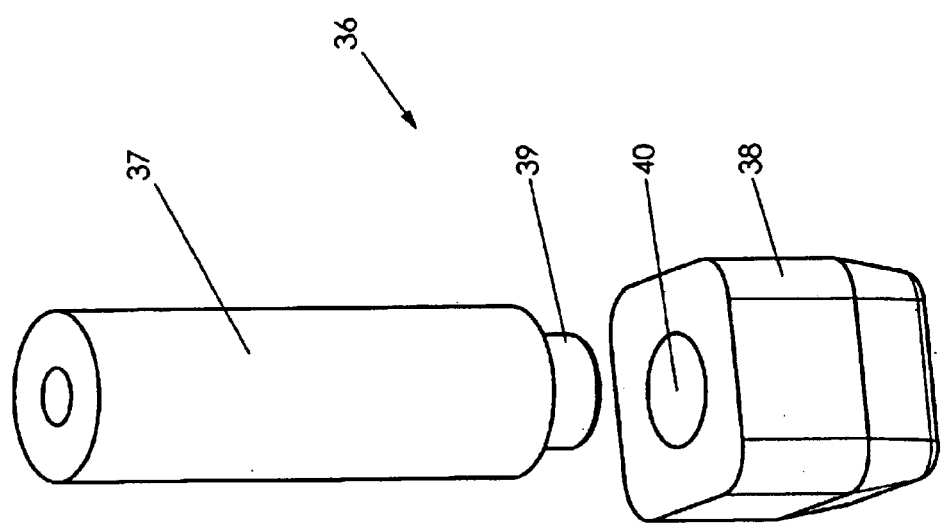
FIG. 8 is a schematical, perspective view of another shape of the lower plunger part for pressing traditional, "Praline"-like shells.

Another example of a plunger 36 according to the inventive idea is disclosed in FIG. 8 in exploded view. The plunger comprises an upper part 37 with circular cross-section and a lower part 38 with non-circular cross-section. The lower part 38 with non-circular cross-section is more cubic-like and is adapted for the pressing of chocolate shells for articles such as "Pralinen". The joining between the upper part 37 and the lower part 38 is disclosed with tight-fitting friction means or surfaces 39, 40.

Figure 9:
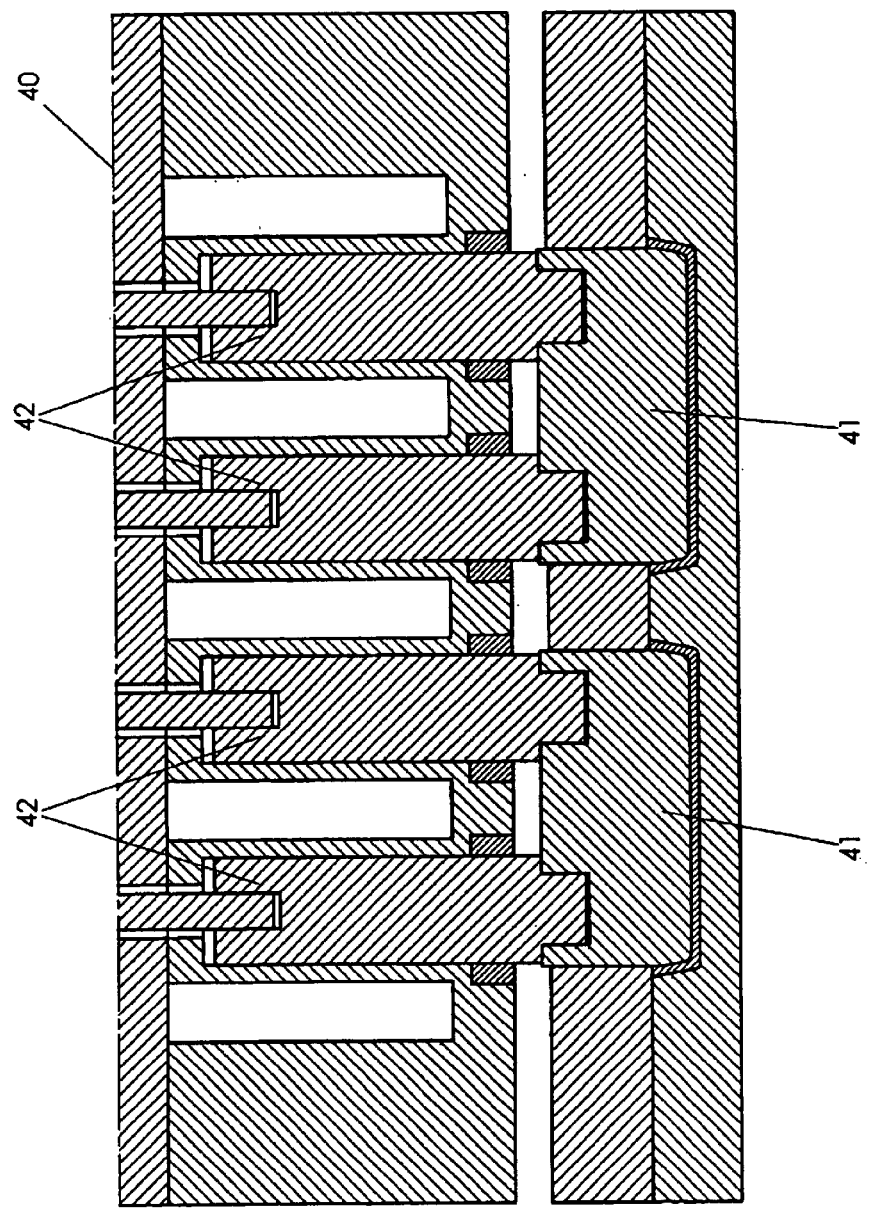
FIG. 9 is a schematical section of another holding device, by which each plunger is joined with two upper plunger parts with circular section.

In FIG. 9 is disclosed another example of a holding device 40, by which each lower plunger part 41 is joined with two upper plunger parts 42. The configuration is useful when odd shaped of the articles are to be made. In the example disclosed a long, slim cross-section of the lower plunger part 41 is to be used for obtaining the desired geometry of the articles to be pressed. By joining the lower plunger parts with such configurations with at least two upper plunger parts 42 having smaller circular cross-sections in stead of joining them with only one upper plunger parts, the plungers may be arranged closely to each other at the holding device 40 and yet is sufficient cooling of the lower plunger parts 41 achieved through the multiple upper plunger parts 42. The closer arrangement of the lower plunger parts 41 to each other obtains a high number of mould cavities in each mould plate and consequently an optimal high number of articles to be pressed in each pressing stroke.

Figure 10:
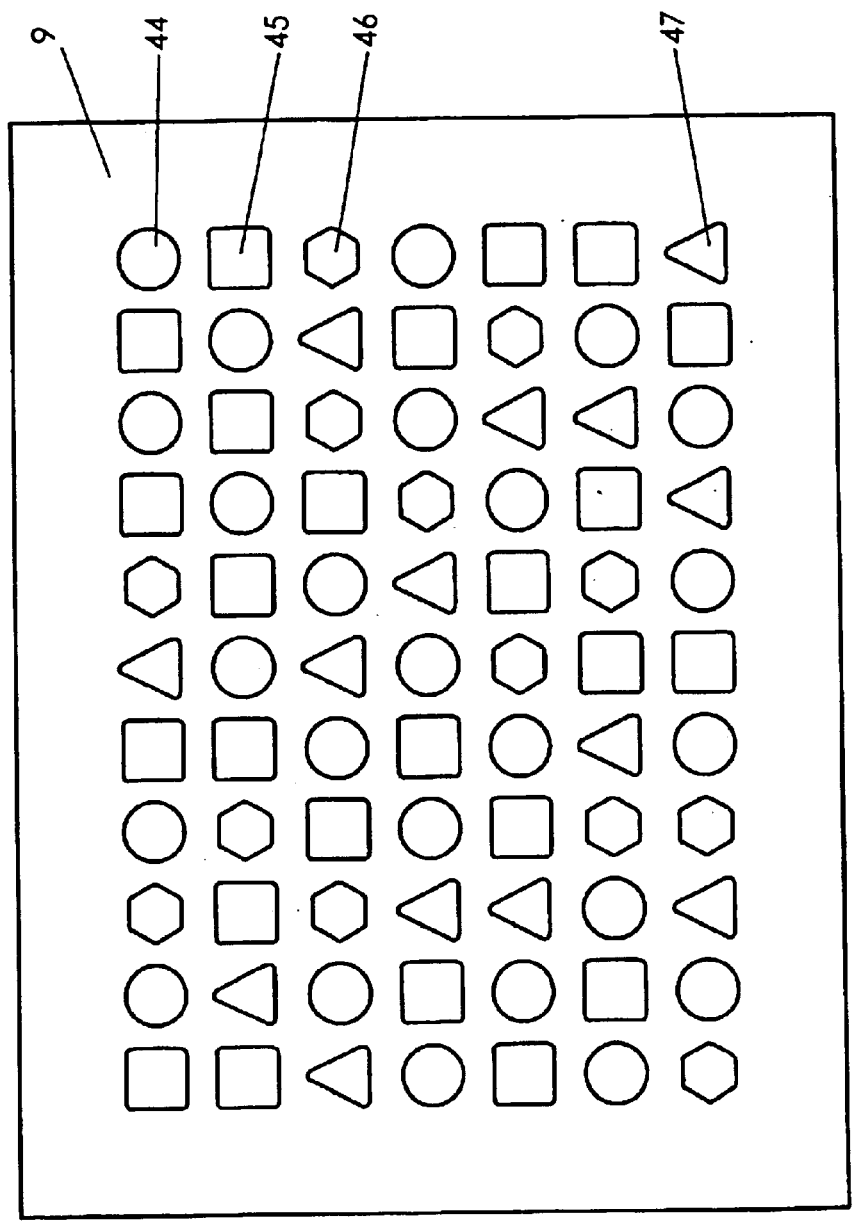
FIG. 10 is a schematical view of a another holding device, seen from below with differently shaped lower plunger parts.

In FIG. 10 is disclosed the holding device 9 of FIG. 2 now carrying a plurality of differently shaped lower plunger parts 44, 45, 46 and 47. The plunger parts 44 are circular, the parts 45 are cubic, the parts 46 are quadrangular and the parts 47 are triangular, however any shapes may apply in accordance with the actual requirement as long as the lower plunger parts are joined with the upper plunger parts 16. The advantage is, that the individual lower plunger parts fixed to the same holding device may have different configuration, so that differently shaped chocolate articles is pressed with the same holding device. The mutual arrangement or pattern of the differently shaped articles 44, 45, 46 and 47 pressed in the same pressing stroke may furthermore be transferred directly into a sales box. Cumbersome handling and sorting of differently shaped articles are thereby avoided.

So, when differently shaped articles are to be produced this can be done in the one and same production line. Differently shaped lower plunger parts are simply joined with the upper plunger parts of the same holding device. The underlying moulds then comprises differently shaped cavities arranged under the appropriate lower plunger parts. Several differently shaped articles are then made in the same moulding operation and the need for further moulding lines is avoided. The differently shaped lower plunger parts may be arranged in a mutual pattern, which is desirable to be transferred directly into a box, such as a gift box when the articles are to be packed.

What is claimed is:

1. An apparatus for pressing an edible article, comprising:
   a holding device including a channel for circulating a cooling liquid and also including at least one independently suspended plunger;
   wherein the at least one independently suspended plunger includes a lower part with a pressing surface configured to be pressed into contact with an edible mass,
   wherein the at least one independently suspended plunger also includes an upper part with a sliding surface supported by an opposing sliding surface that defines an opening of the holding device,
   wherein the upper part has a circular cross-section and the lower part has a non-circular cross-section,
   wherein the upper part and the lower part are separate parts that are joined together.

2. An apparatus according to claim 1, wherein the upper part and lower part are joined to each other by a screw joint.

3. An apparatus according to claim 1, wherein the apparatus includes at least two lower parts and the non-circular cross-section of one of the at least two lower parts is different from the non-circular cross-section of another of the at least two lower parts.

4. An apparatus according to claim 1, further comprising a closure plate having an opening through which the lower part extends,
   wherein the closure plate is movably suspended below the holding device.

5. Apparatus according to claim 1, wherein the apparatus includes more than one upper parts and the lower part is joined to the more than one upper parts.

6. An apparatus according to claim 1, wherein the pressing surface has a high gloss.

7. An apparatus according to claim 1, wherein the pressing surface of the at least one independently suspended plunger is adapted to be immersed into the edible mass so as to shape an inner cavity of a shell.

8. An apparatus according to claim 1, wherein the pressing surface of the at least one independently suspended plunger is adapted to be pressed into an edible covering mass so as to shape a surface of an already made edible article.

9. An apparatus according to claim 1, wherein the pressing surface of the at least one independently suspended plunger is adapted to be pressed into an edible covering mass so as to shape a surface of an already made edible article.

10. An apparatus according to claim 1, further comprising a housing,
    wherein the holding device is arranged in the housing.

11. An apparatus according to claim 10, further comprising a source of dry air adapted to blow dry air into the housing around the pressing surface of the lower part.

12. An apparatus according to claim 1, wherein the lower part is free of lubricant.

13. An apparatus according to claim 1, wherein the apparatus is adapted to keep a temperature of the pressing surface below a solidification temperature of the edible mass, during the pressing of the edible mass, by circulating the cooling liquid through the channel of the holding device.

14. An apparatus according to claim 1, wherein the upper part and the lower part do not include a channel for flowing the cooling liquid.

15. An apparatus according to claim 1, wherein the edible mass is pressed in underlying mold cavities.

16. Apparatus according to claim 1, wherein the edible mass is chocolate.

17. Apparatus according to claim 1, wherein the edible article is chocolate.

* * * * *